(No Model.)
I. N. FORRESTER.
CHILD'S CARRIAGE.
No. 330,308. Patented Nov. 10, 1885.
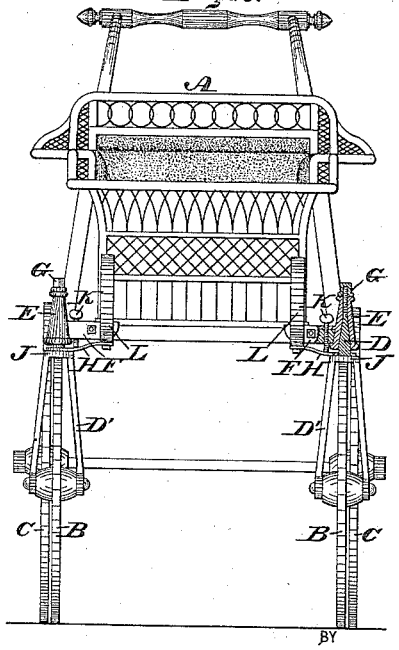
WITNESSES:
Ag. P. Grant,
W. F. Kircher
INVENTOR:
I. N. Forrester
BY John A. Wiedersheim
ATTORNEY.
N. PETERS, Photo-Lithographer, Washington, D. C.

UNITED STATES PATENT OFFICE.

ISAAC N. FORRESTER, OF CAMDEN, NEW JERSEY.

CHILD'S CARRIAGE.

SPECIFICATION forming part of Letters Patent No. 330,308, dated November 10, 1885.

Application filed February 10, 1885. Serial No. 155,482. (No model.)

*To all whom it may concern:*

Be it known that I, ISAAC N. FORRESTER, a citizen of the United States, residing in the city and county of Camden and State of New Jersey, have invented a new and useful Improvement in Children's Carriages, which improvement is fully set forth in the following specification and accompanying drawings, in which—

Figure 1 represents a side elevation of a child's carriage embodying my invention. Fig. 2 represents a front view thereof.

Similar letters of reference indicate corresponding parts in the two figures.

My invention consists of a child's carriage having a caster-wheel and means for producing additional friction on the shank or journal thereof, whereby undue oscillation of the wheel is prevented.

Referring to the drawings, A represents the body of a child's carriage, and B C the wheels thereof. The wheels B are of the order of caster-wheels, the shanks or journals D of which are fitted in sockets E, which are connected with the supports F of the body A, or may be attached to said body. The journals D, which are at the top of the arms or forks D', are of conical form, and the inner walls of the sockets E accord therewith, said journals being extended above the sockets and threaded for engagement of nuts G, whereby the journals are properly retained in the sockets and provision is made for adjusting the friction between the journals and sockets, whereby the caster-wheels may rotate with sufficient freedom, but under proper control to prevent undue oscillation thereof when the carriage is in service.

Connected with the supports F, or, if desired, with the body of the carriage, are springs H, which bear upon shoulders J at the top of the arms or forks D' of the wheel, or at the base of the journals, whereby friction is created on said shoulders for controlling the oscillations or rotations of the caster-wheels. Screws K are fitted to the supports F or body A, and have their points in contact with the springs H, whereby the degree of pressure of said springs, and consequently of the resultant friction on the caster-wheels, may be adjusted.

If desired, the springs H may be continuous of the springs L, on which the body of the carriage is rested; and again, if desired, springs may be interposed between the sockets E and nuts G, by which provision, while the caster-roller rotates with ease and the carriage may be guided with facility without the jerking and rough action heretofore occasioned, the motions or oscillations of the caster-wheels are controlled, so that they are prevented from undue tendency to oscillate, and their regularity of motion is accordingly occasioned.

If desired, a single caster-wheel may be employed in lieu of the two caster-wheels shown, and said wheel will be located at the middle, and may be of any desired size.

Having thus described my invention, what I claim as new, and desire to secure by Letters Patent, is—

1. In a child's carriage, a caster-wheel, in combination with a spring bearing on said wheel and an adjusting-screw for said spring, substantially as and for the purpose set forth.

2. In a child's carriage, the caster-wheel B, having a conical shank provided with a threaded end and a nut, in combination with supports F and springs L and H, the spring H having one end pressing on the shoulder J of the caster-wheel, substantially as and for the purpose set forth.

3. In a child's carriage, a caster-wheel having arms D' and shoulder J, in combination with the supports of the body of the carriage, springs J and H, and screw K, the said screw passing through the said supports and pressing the said spring H against the said shoulder J, substantially as and for the purpose set forth.

I. N. FORRESTER.

Witnesses:
JOHN A. WIEDERSHEIM,
A. P. GRANT.